(12) United States Patent
Driskell et al.

(10) Patent No.: US 8,939,767 B2
(45) Date of Patent: *Jan. 27, 2015

(54) POLYGONAL DEVICE FOR KINESTHETIC LEARNERS

(71) Applicant: Shannon Driskell, Dayton, OH (US)

(72) Inventors: Shannon Driskell, Dayton, OH (US); Stephen Jaymes Becker, Walton, KY (US); Hannah Ji.in Chung, Lawrenceville, GA (US); Joshua Robert Craven, Kettering, OH (US); Philip Doepker, Dayton, OH (US); Amanda O'Connell, Kettering, OH (US); Le Allen Richardson, Costa Mesa, CA (US); Donald Edward Schenk, Vandalia, OH (US); Douglas Weithas Smith, Fredericksburg, VA (US); Virginia Lynn Tremblay, Findlay, OH (US)

(73) Assignee: Shannon Driskell, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,743

(22) Filed: Mar. 8, 2013

(65) Prior Publication Data

US 2013/0183644 A1 Jul. 18, 2013

Related U.S. Application Data

(63) Continuation of application No. 12/862,306, filed on Aug. 24, 2010, now Pat. No. 8,444,419.

(60) Provisional application No. 61/236,768, filed on Aug. 25, 2009.

(51) Int. Cl.
G09B 23/04 (2006.01)

(52) U.S. Cl.
CPC .................................... *G09B 23/04* (2013.01)
USPC ........................................................ 434/211

(58) Field of Classification Search
CPC .......... G09B 23/02; G09B 23/04; B25H 7/00; B43L 7/02; B43L 7/033; B43L 13/002; G01B 3/56
USPC ................. 434/72, 79, 81, 96, 211, 212, 214; 446/85, 105, 106, 108, 116, 120, 121; 33/434, 465, 468–470
See application file for complete search history.

(56) References Cited

U.S. PATENT DOCUMENTS

| 662,977 A | 12/1900 | Schmelz |
| 1,541,179 A | 6/1925 | Parkinson |

(Continued)

OTHER PUBLICATIONS

GeoLeg, Welcome! [online], [retrieved on Oct. 22, 2009], Retrieved from the Internet <URL: http://www.geoleg.com/>.

(Continued)

*Primary Examiner* — Kurt Fernstrom
(74) *Attorney, Agent, or Firm* — Thomas E. Lees, LLC

(57) ABSTRACT

A polygonal device for teaching students who prefer kinesthetic learning methods is presented in which the polygonal device can represent two-dimensional polygons of varying shapes and sizes. One or more of the sides, or legs, of the polygonal device are extendable, and the angles of the polygonal device may be manipulated to a desired angle. The devices presented include, but are not limited to, triangles, quadrilaterals, parallelograms, rectangles, squares, trapezoids, and kites. In each of these devices, the legs of the device are non-detachable, i.e. the device does not come apart during normal manipulation and operation.

20 Claims, 15 Drawing Sheets

(56) References Cited

U.S. PATENT DOCUMENTS

| | | | |
|---|---|---|---|
| 1,999,105 | A | 12/1931 | Milla |
| 2,208,049 | A | 7/1940 | Pajeau |
| 2,460,713 | A | 2/1949 | Richardson |
| 2,505,149 | A | 4/1950 | Schoenberg |
| 2,709,318 | A | 5/1955 | Benajmin |
| 2,776,521 | A | 1/1957 | Zimmerman |
| 3,486,232 | A | 12/1969 | Klauberg |
| 3,648,404 | A | 3/1972 | Ogsbury et al. |
| 4,872,267 | A | 10/1989 | Anderton |
| 4,886,477 | A | 12/1989 | Ziegler |
| 5,049,104 | A | 9/1991 | Olsen |
| 5,183,430 | A | 2/1993 | Swann |
| 5,259,803 | A | 11/1993 | Lyman |
| 5,281,145 | A | 1/1994 | Sidrak |
| D378,106 | S | 2/1997 | Gabriel |
| 5,732,474 | A * | 3/1998 | Cannon .................. 33/452 |
| 5,897,417 | A | 4/1999 | Grey |
| 6,129,551 | A | 10/2000 | Martin |
| 6,135,851 | A * | 10/2000 | Drake et al. .................. 446/487 |
| 6,398,612 | B2 | 6/2002 | Gudger |
| 6,941,667 | B2 * | 9/2005 | Bauldock, Sr. .................. 33/472 |
| 7,267,598 | B2 | 9/2007 | Glickman |
| 7,428,782 | B1 * | 9/2008 | Beck et al. .................. 33/435 |
| 8,210,898 | B2 | 7/2012 | Johnson |
| 2006/0141427 | A1 | 6/2006 | Harrigan |
| 2008/0241814 | A1 * | 10/2008 | Seidl .................. 434/432 |

OTHER PUBLICATIONS

Learning Resources, Plastic Geoboards [online], 2009 [retrieved on Oct. 22, 2009], Retrieved from the Internet <URL: http://www.learningresources.com>, search Geoboards.

Didax Educational Resources, Geo Strips [online], [retrieved on Oct. 22, 2009), Retrieved from the Internet <URL: http://www.didax.com/shop/productdetails.cfm/ItemNo/8-141.cfm>.

Classroom Products Warehouse, AngLegs [online], 2009 [retrieved on Oct. 22, 2009], Retrieved from the Internet <URL: http://www.classroomproductswarehouse.com/cpw/anglegs.jsp>.

Zometool, Welcome to the Zometool Universe [online], 2008 [retrieved on Oct. 22, 2009]. Retrieved from the Internet <URL: http://www.zometool.com/>.

k'nex, k'nex [online], 2009 [retrieved on Oct. 22, 2009], Retrieved from the Internet <URL: http//www.knex.com/>.

Pearson, Grade 6 Student Manipulatives Kit 2 [online], 2009 [retrieved on Oct. 25, 2009], Retrieved from the Internet <URL http://www.pearsonschool.com>, search Polystrips.

* cited by examiner

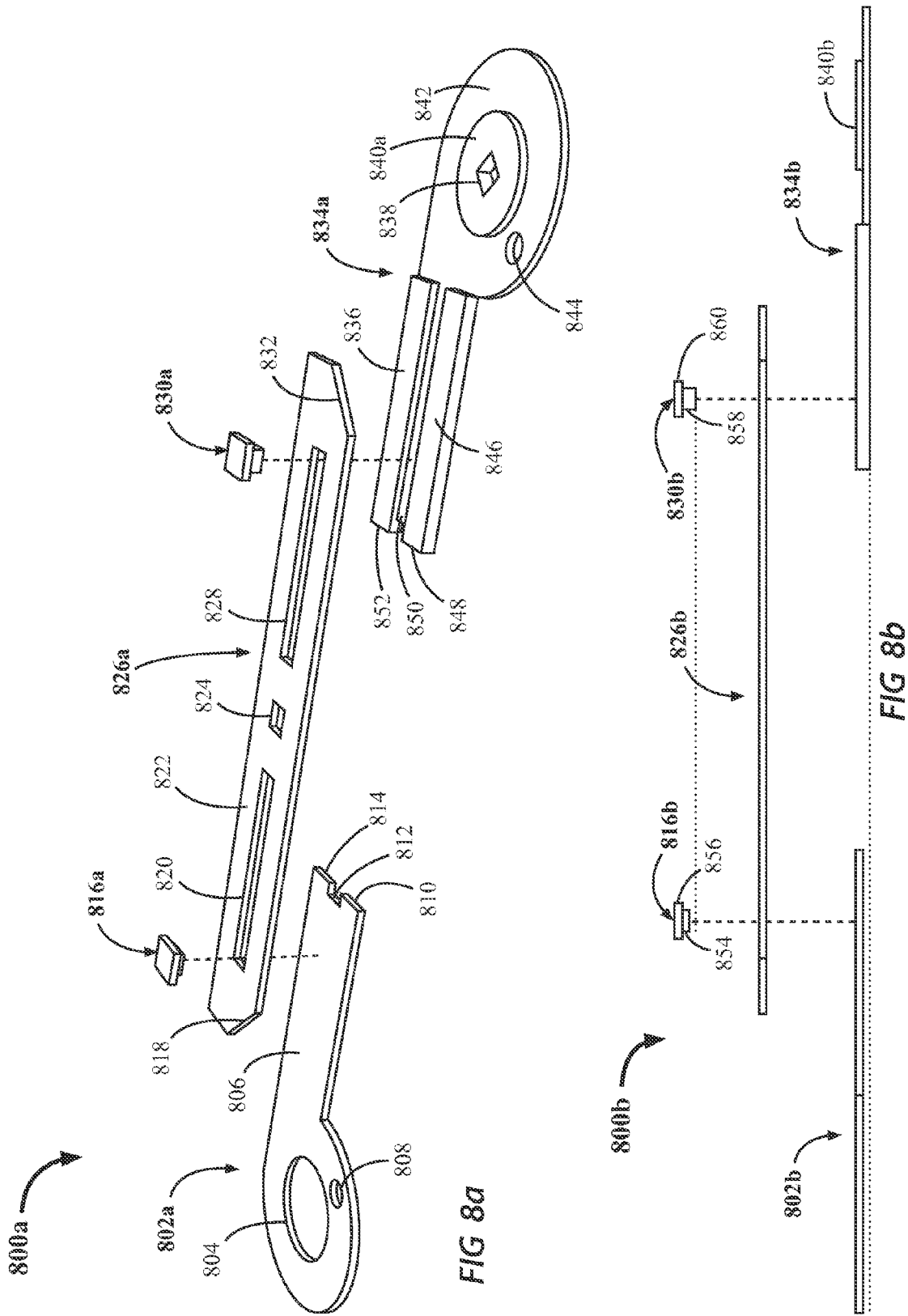

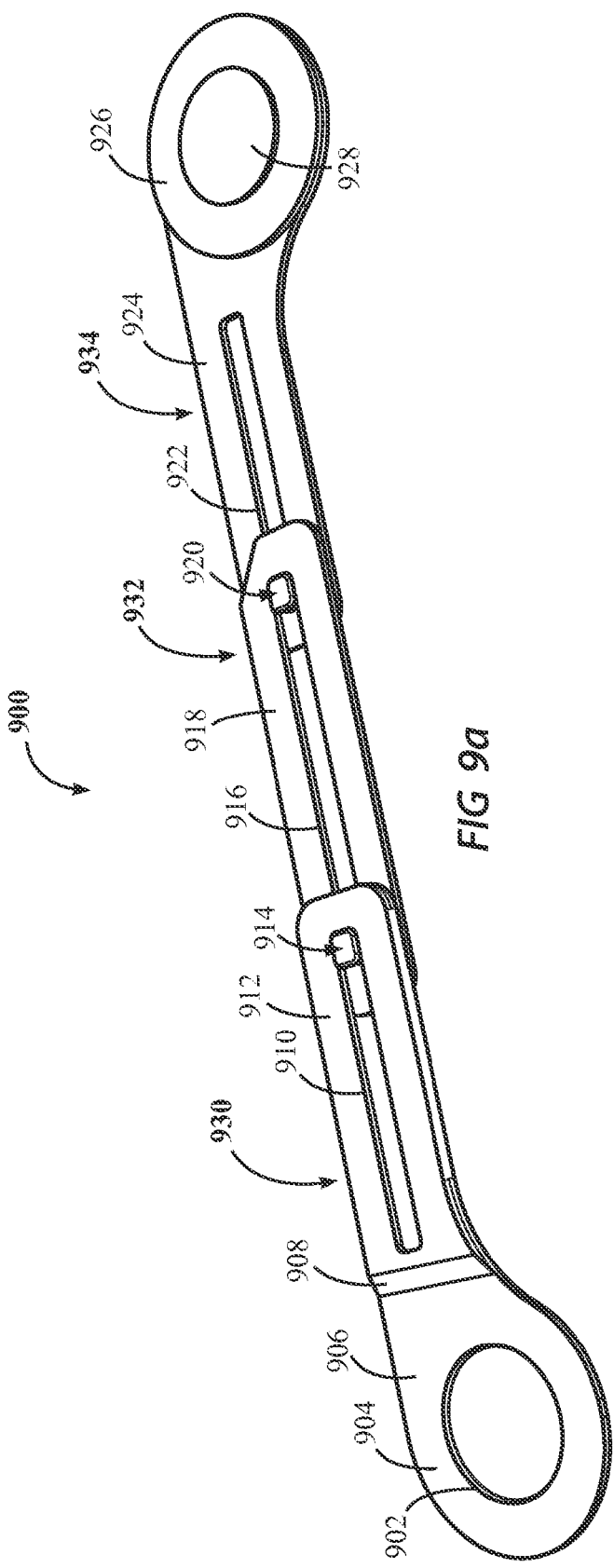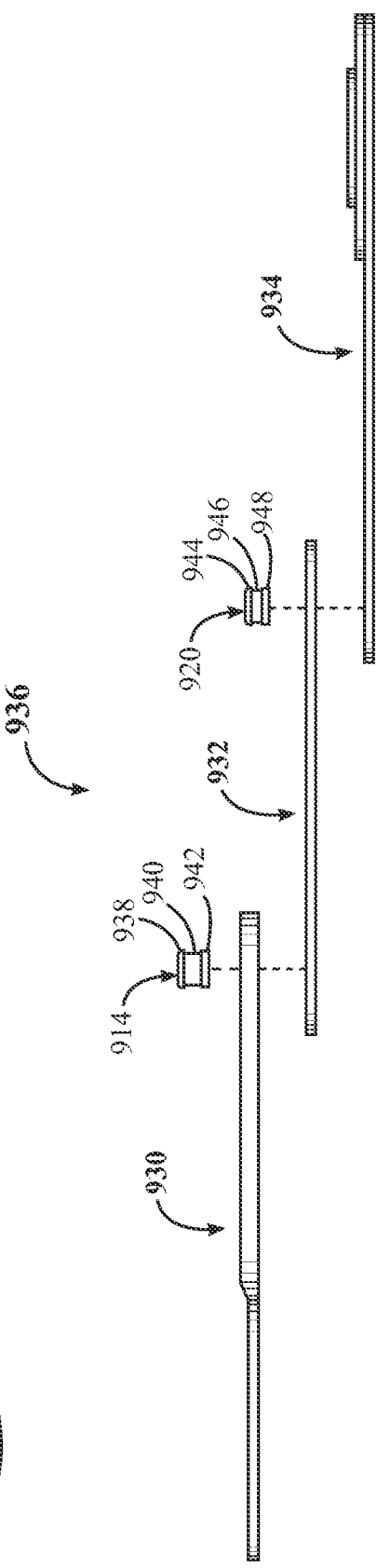

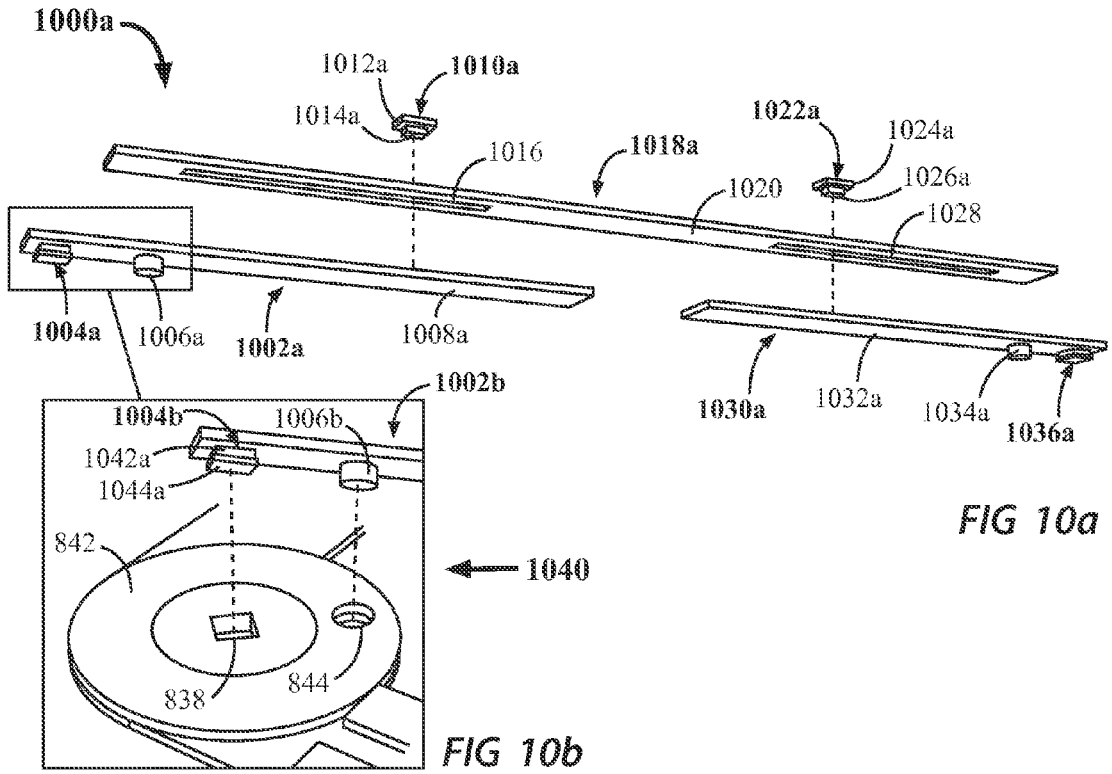
FIG 10a
FIG 10b
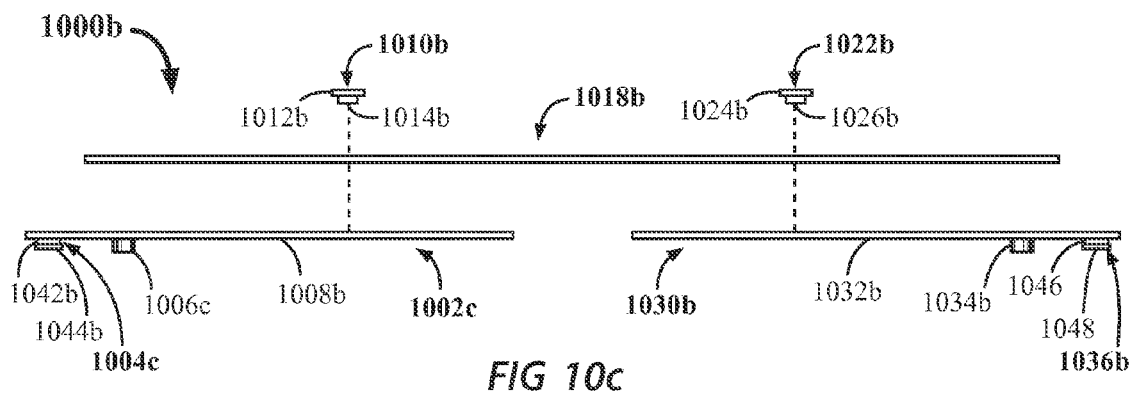
FIG 10c
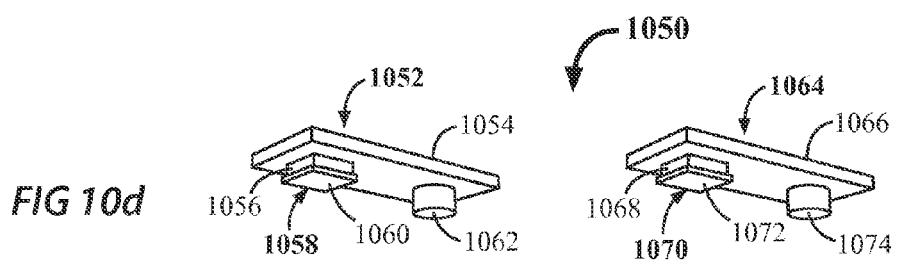
FIG 10d

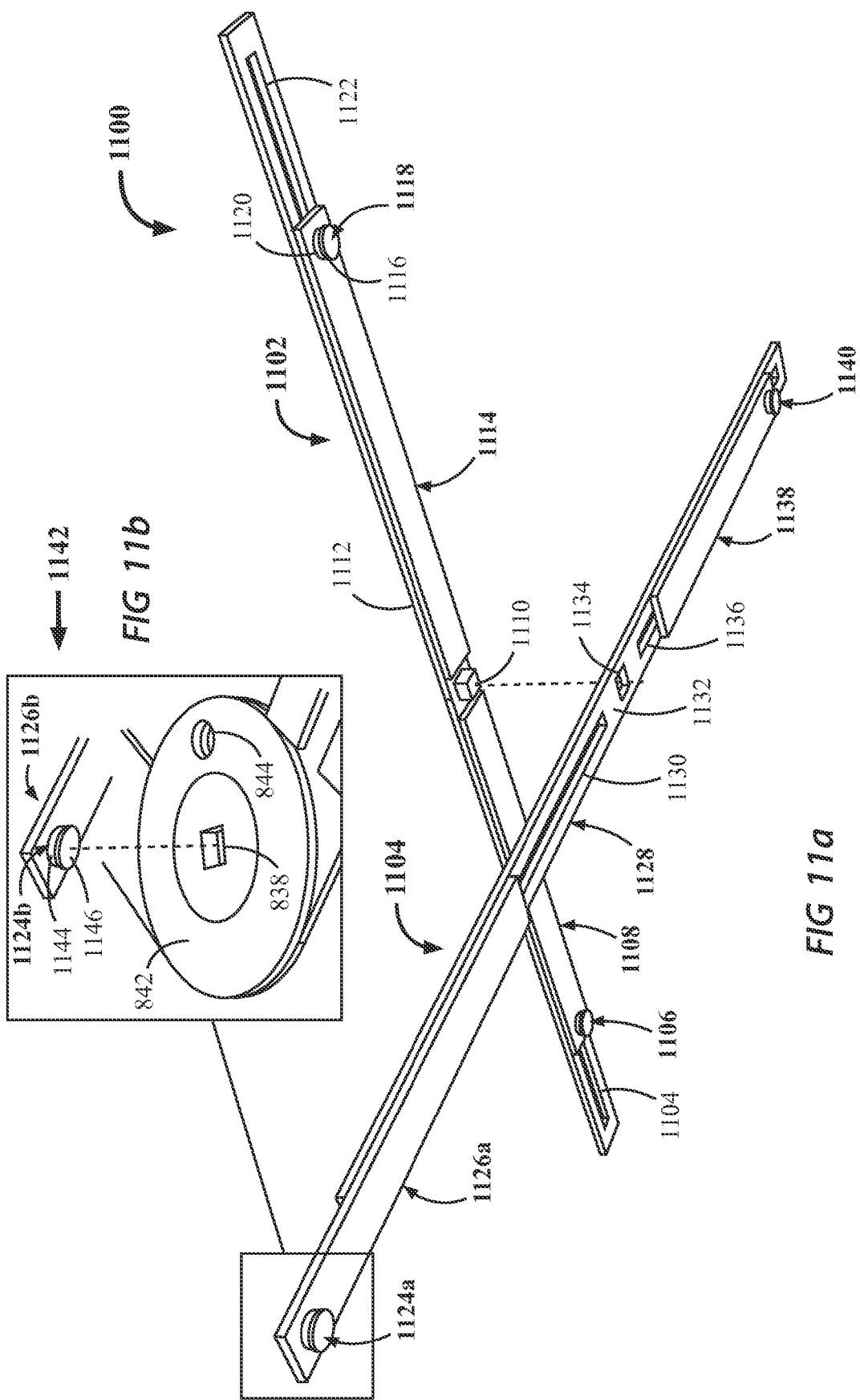

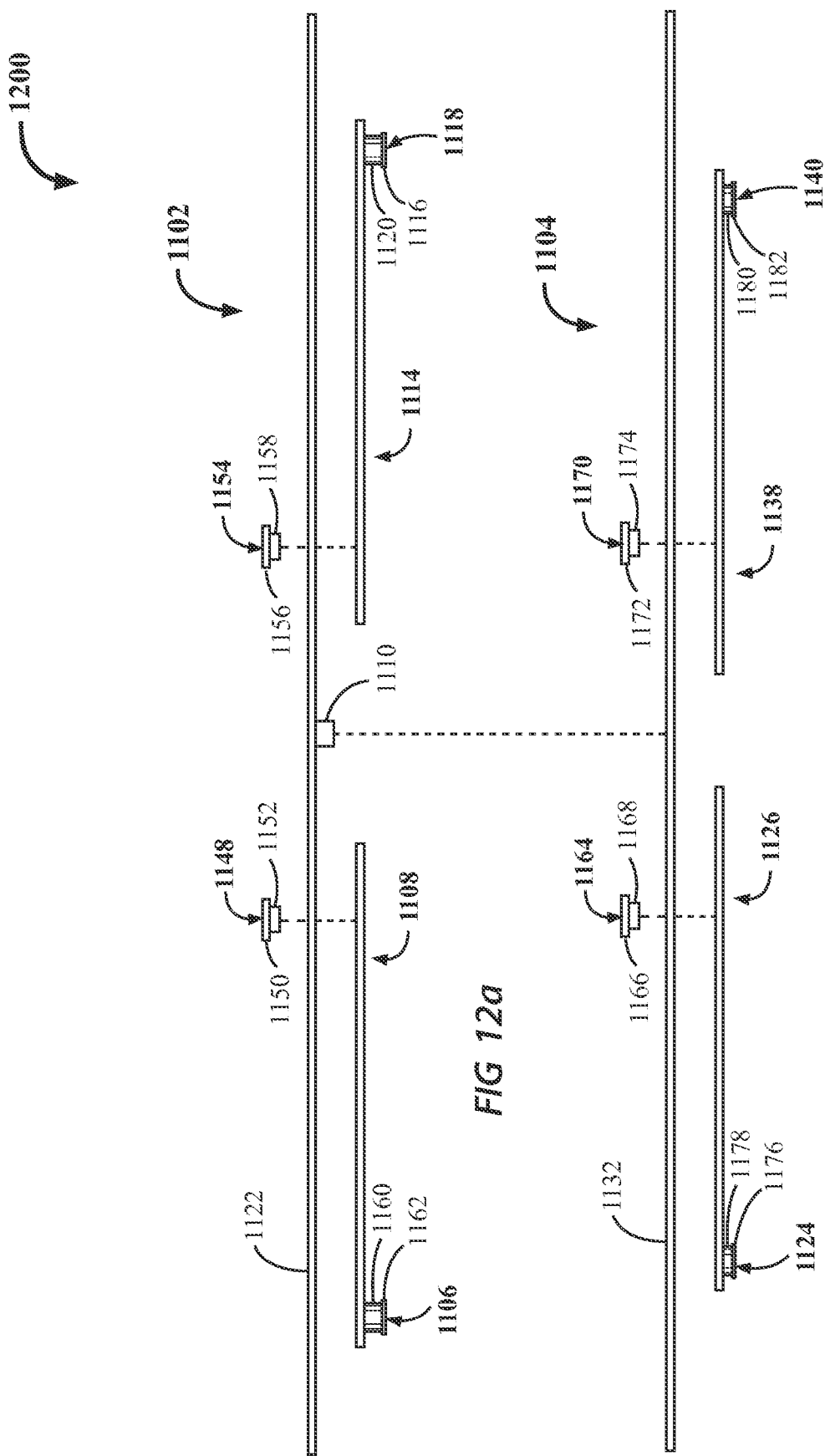

POLYGONAL DEVICE FOR KINESTHETIC LEARNERS

CROSS-REFERENCE TO RELATED APPLICATIONS

This application is a continuation of U.S. patent application Ser. No. 12/862,306, filed Aug. 24, 2010, entitled "POLYGONAL DEVICE FOR KINESTHETIC LEARNERS", now allowed, which claims priority to U.S. Provisional Patent Application Ser. No. 61/236,768, which was filed on Aug. 25, 2009, by Shannon Driskell, entitled "SHAPE SHIFTERS", the disclosures of which are incorporated herein by reference.

BACKGROUND OF THE DISCLOSURE

Students who learn kinesthetically may have a hard time learning the abstract ideas behind two-dimensional geometry. Traditionally, sets of detachable sides and angles have been used to teach these kinesthetic learners. The traditional approach may allow a student to manipulate the sides and angles of a polygon, however, it does not allow the student to pick up the finished polygon and have the polygon remain intact. Also, the traditional approach does not allow a teacher to manipulate the polygonal device real-time in front of an entire class and then pass around the created polygon so the students may see the polygon up close, because the detachable sides may fall apart. Thus there is a continuing need for a device to aid in the education of geometry to kinesthetic learners.

DEFINITIONS

For clarity, several of the terms, which are used throughout the written description and the claims, are defined below:

"Détente structure" is defined as a pairing of a stopper or stub and a hole to secure an extendable leg, constraint, or hinged angle. In reference to the détente structure, a hole may be merely a depression or groove that does not extend the entire way through an object.

"Device" is defined as apparatus.

"Diagonal" is defined as an imaginary line connecting opposite corners of a quadrilateral.

"Extendable" and variants thereof are defined as extendable and contractible, and thus able to be manipulated by a user.

"Fixed angle" is defined as an angle that cannot be manipulated.

"Leg" is defined as a side of a polygonal device. A leg may be extendable (able to be manipulated) or non-extendable (fixed).

"Lockable angle" and variants thereof are defined as angles that are hinged and able to be manipulated by a user, unless a locking mechanism is engaged, in which case, the angles cannot be manipulated by the user until the locking mechanism is released.

"Non-detachable" and variants thereof are defined as not intended to be taken apart.

"Polygon" and variants thereof are defined as a two-dimensional shape alternating sides and angles which form a closed shape. A polygon has an equal number of sides and angles. A "polygonal device" is an apparatus that represents a polygon.

SUMMARY OF THE DISCLOSURE

The present disclosure provides a polygonal device that may be employed to teach kinesthetic learners geometry, specifically two-dimensional geometric polygonal shapes. The polygonal device has extendable legs, which are non-detachable from each other, and angles. Certain embodiments have hinged angles to allow a user to manipulate the degree of the angles. In some embodiments, the extendable legs extend telescopically, while in other embodiments, the extendable legs extend via a détente structure, and in further embodiments, the extendable legs extend via a sliding structure. Several embodiments include an angle indicator to provide the angle measurement between two adjacent legs.

In certain embodiments, a constraint is utilized to force the polygonal device to remain in a certain shape while being manipulated by an associated user. These constraints include, but are not limited to, a square constraint, a kite constraint, and a parallel constraint.

BRIEF DESCRIPTION OF THE DRAWINGS

One or more exemplary embodiments are set forth in the following detailed description and the drawings, in which:

FIG. 8A is an isometric schematic diagram illustrating a sliding leg structure;

FIG. 8B is a side-view schematic diagram illustrating a sliding leg structure;

FIG. 9A is an isometric schematic diagram illustrating a stacked-sliding leg structure;

FIG. 9B is a side-view schematic diagram illustrating a stacked sliding leg structure;

FIG. 10A is an isometric view of an angle-to-angle angle constraint with variable length;

FIG. 10B is a detailed view of an angle with an angle-to-angle angle constraint;

FIG. 10C is a side view of the angle-to-angle angle constraint with variable length;

FIG. 10D is an isometric view of a pair of single angle constraints;

FIG. 11A is an isometric view of a kite constraint;

FIG. 11B is a detailed view of an angle and the kite constraint;

FIG. 12A is a side view of a pegged section of the kite constraint;

FIG. 12B is a side view of a holed section of the kite constraint;

DETAILED DESCRIPTION

Figure 1:
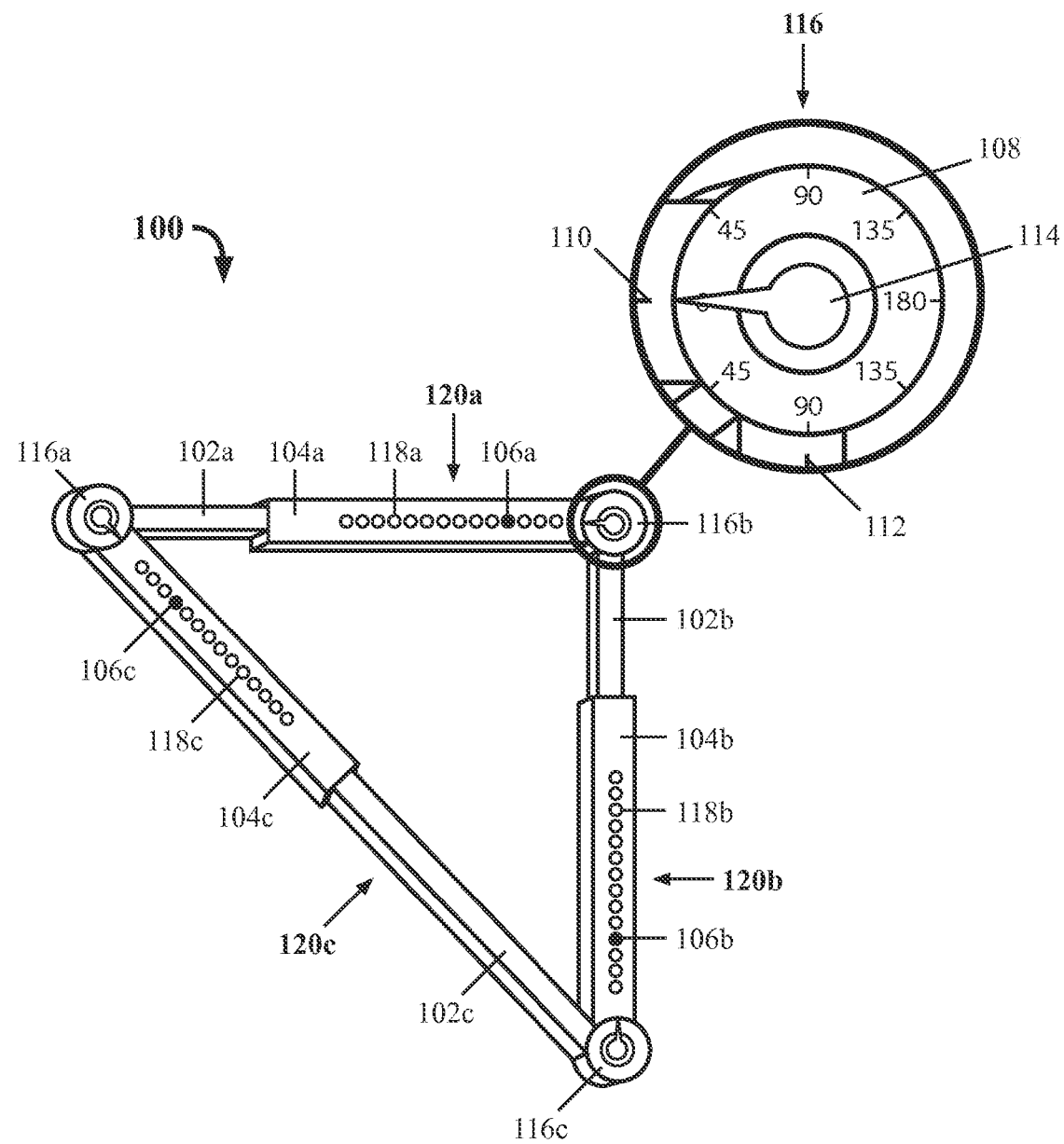
FIG. 1 is a schematic diagram illustrating an exemplary polygonal device for kinesthetic learners where the polygonal shape is a triangle with a détente leg structure, including a detailed view of an angle.

Referring now to the drawings, wherein various features are not necessarily drawn to scale, the present disclosure relates to educating kinesthetic learners and more particularly to a device that aids kinesthetic learners in the understanding of two-dimensional polygons in geometry. The exemplary devices described herein can also be used in other areas and are not limited to the aforementioned application of education.

With continued reference to the drawings, each of the polygonal devices has several legs and an equal amount of angles. Each polygonal device illustrated in the drawings has identical leg structures for each of the legs. However, the legs are not required to have identical leg structures. Further, every leg of the polygonal devices is shown to be extendable. However, only one of the legs needs to be extendable, one or more of the legs may be of fixed length. In some embodiments, the legs are marked with a length indicator to show the length of the leg.

Each device represents a polygonal shape, and thus must be closed and alternate angles and legs. Some embodiments include a constraint which limits the user's ability to manipulate the device. For example, a device with a square constraint limits the user from manipulating the device into anything but a square. Similarly, a kite constraint limits the user from manipulating the device into anything but a kite. Other constraints besides square and kite are discussed in greater detail in reference to the figures below.

FIG. 1 illustrates an embodiment of the polygonal device 100 for kinesthetic learners. In this embodiment, the polygonal device 100 is a triangle and comprises three extendable legs 120a, 120b, 120c (collectively 120), and three hinged angles 116a, 116b, 116c. The extendable legs 120 each include two sections, a first section 102 and a second section 104. The first section 102 fits into the second section 104 and creates a détente leg structure. The first section 102 includes a stopper 106 and the second section 104 includes a plurality of holes 118. The structure and operation of the détente leg structure is described in greater detail below in reference to FIGS. 6A and 6B. In certain embodiments, the extendable legs 120 may be extended through a telescopic structure, which is described in greater detail in reference to FIG. 5. In other embodiments, the extendable legs may be extended through a sliding structure, which is discussed in greater detail in reference to FIGS. 8A, 8B, 9A, and 9B below. The triangular device 100 with sliding leg structures is described in greater detail in reference to FIG. 15B. Further, the extendable legs 120 may have any number of sections. Each leg 120 does not need to have the same number of sections as the other legs 120 in the device 100.

In this embodiment, the angles 116 of the triangular device 100 include a hinge which allows the degree of the angle 116 to be manipulated by the user. Some embodiments include an angle indicator 114. The angle indicator 114 is a pointer and a face-plate 108 that indicates angles around a circle. The face-plate 108 may mark angles 116 for an entire circle or just half of the circle and back again. The markings may be marked directly on the device 100 itself, instead of using a face-plate. Further, the markings may be in degrees, radians, or another measurement for angles. The illustrated example shows a face-plate 108 marked for half a circle and back again in degrees. To determine the degree of the angle 116, the user identifies the number on the face-plate 108 associated with the second leg 112 and subtracts the number on the face-plate 108 associated with the first leg 110. The first leg 110 can be fixed to zero degrees to make this subtraction process much easier for the user.

Figure 3B:
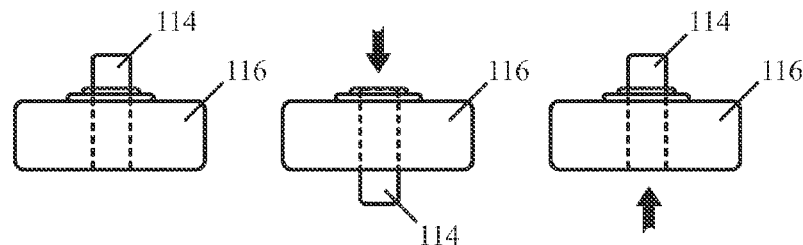
FIG. 3B is a schematic diagram illustrating the locking structure of an angle.

Additional embodiments include a locking mechanism for the hinged angles 116, which is described in greater detail in reference to FIG. 3B. In other embodiments, one or more of the angles 116 are fixed, i.e. not hinged. In all embodiments, the angles 116 are non-detachable from the legs 120.

Figure 2:
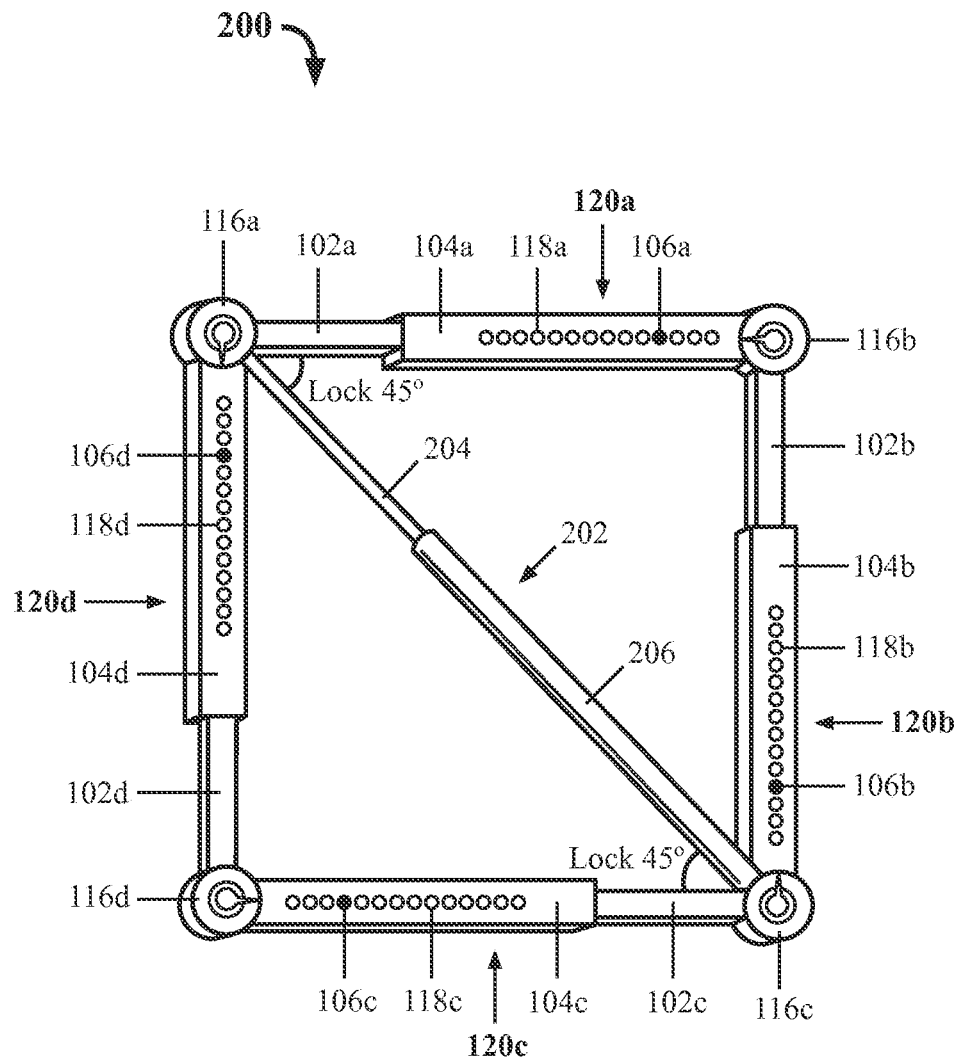
FIG. 2 is a schematic diagram illustrating an exemplary polygonal device for kinesthetic learners where the polygonal shape is a square with a détente leg structure.

FIG. 2 illustrates an exemplary polygonal device 200 for kinesthetic learners where the polygonal shape is a square. The polygonal device 200 comprises four extendable legs 120, four fixed angles 116, and a square constraint 202.

In this embodiment, the extendable legs 120 each include two sections, a first section 102 and a second section 104. The first section 102 fits into the section 104. A détente structure is formed from a stopper 106 attached to the end of the first section 102 and a plurality of holes 118 of the second section 104. The détente structure is described in greater detail in reference to FIGS. 6A and 6B. As with the triangular device 100 (FIG. 1), the legs may also have any number of sections, a sliding structure, telescopic structure, détente structure, or a combination thereof.

In this embodiment, the angles 116 are fixed at ninety degrees. The square constraint 202 has a first section 204 and a second section 206. The first section 204 of the square constraint 202 fits into the second section 206 of the square constraint 202. In the illustrated embodiment, the square constraint 202 is telescopically extendable; however, the square constraint 202 may extend through a détente structure or sliding structure. If the legs 120 and the square constraint 202 are both extendable through a détente structure, the spacing of the holes (not shown) on the square constraint 202 must be equal to the spacing of the holes 118 on the legs 120 multiplied by the square root of two.

With further reference to FIG. 2, the square constraint 202 couples a first angle 116a and its diagonally-opposite angle 116c. With the angle of the square constraint 202 fixed at forty-five degrees in reference to the leg 120a, all the angles 116 of the square device 200 are fixed at ninety degrees. Therefore, when the user manipulates the length of a leg 120a, then all of the other legs 120b, 120c, 120d must change their length equal to the manipulated length of 120a, keeping all of the sides the same length.

Figure 3A:
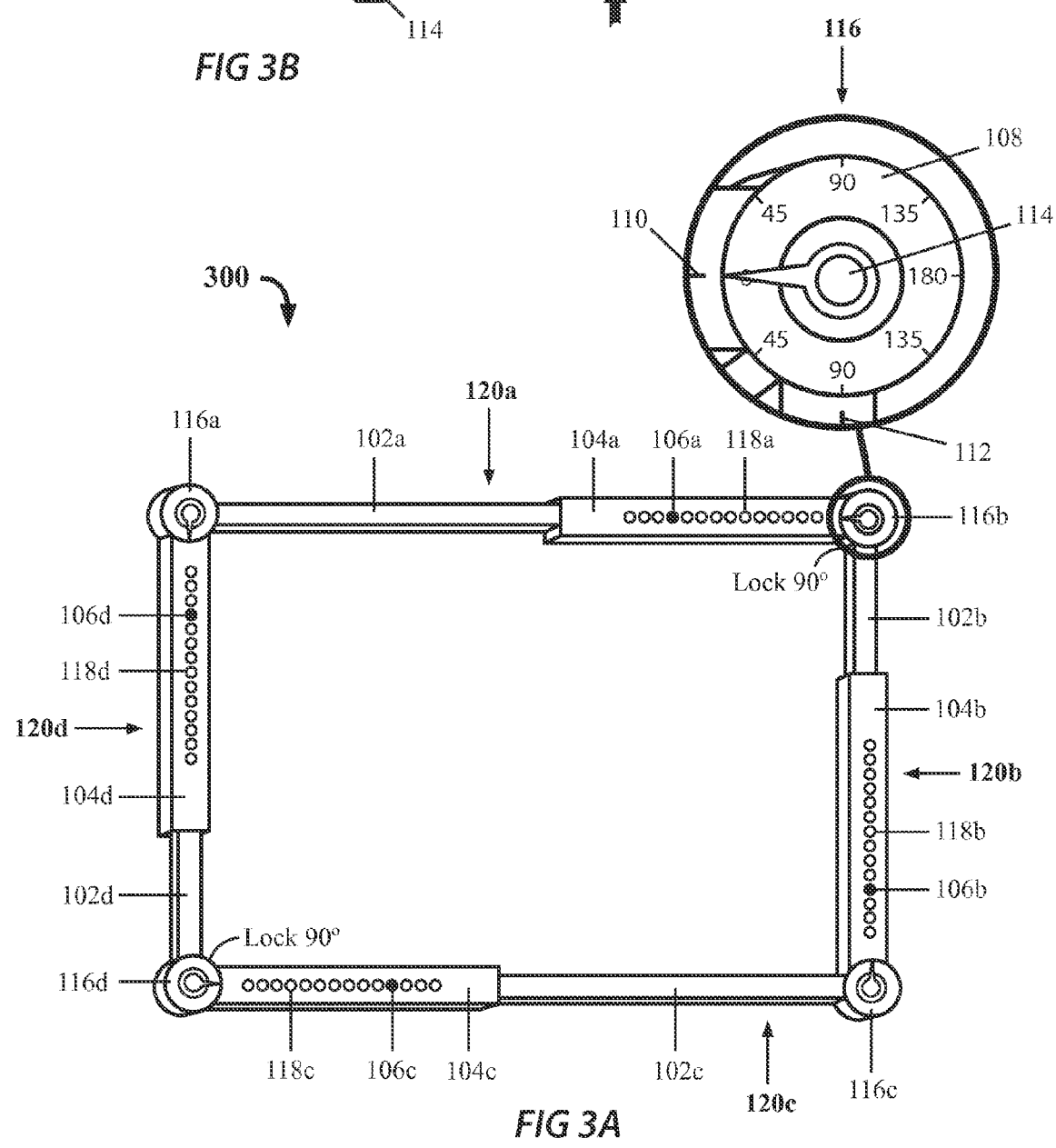
FIG. 3A is a schematic diagram illustrating an exemplary polygonal device for kinesthetic learners where the polygonal shape is a rectangle with a détente leg structure, including a detailed view of an angle.

FIG. 3A illustrates a quadrilateral device 300 with four legs 120 and four angles 116. In this embodiment, the extendable legs 120 each include two sections, a first section 102 and a second section 104. The first section 102 fits into the section 104. A détente structure is formed from a stopper 106 attached to the end of the first section 102 and a plurality of holes 118 of the second section 104. The détente structure is described in greater detail in reference to FIGS. 6A and 6B. As with the triangular device 100 (FIG. 1), the legs may also have any number of sections, a sliding structure, telescopic structure, détente structure, or a combination thereof.

In some embodiments one or more of the angles 116 of the quadrilateral device 300 are hinged. In other embodiments, one or more of the hinged angles 116 are lockable. Some embodiments include an angle indicator 114. The angle indicator 114 is a pointer and a face-plate 108 that indicates angles around a circle. The face-plate 108 may mark angles for an entire circle or just half of the circle and back again. The markings may be in degrees, radians, or another measurement for angles. The illustrated example shows a faceplate 108 marked for half a circle and back again in degrees. To determine the degree of the angle, the user subtracts the number on the face-plate 108 associated with the second leg 112 and subtracts the number on the face-plate 108 associated with the first leg 110. The first leg 110 can be fixed to zero degrees to make this subtraction process much easier for the user.

In the illustrated example, the user has locked the four angles 116 at ninety degrees, making the quadrilateral device 300 into a rectangle. With the angles 116 locked at ninety degrees, opposite sides 120a, 120c and 120b, 120d of the device 300 must have equal lengths forming the rectangle.

FIG. 3B illustrates how to lock the angles 116. The angle indicator 114 has a movable portion, which may be pressed by the user. When the indicator is up (in the released position) the angle 116 is able to be manipulated by the user. When the indicator is pressed down (in the locked position) then the angle 116 is not able to be manipulated by the user. The angle may be prevented by moving through a ball bearing in a depression, pure friction, a spring mechanism, or any other locking method. When the user wishes to manipulate a locked angle, the user presses up on the angle indicator 114 and releases the angle 116.

Figure 4:
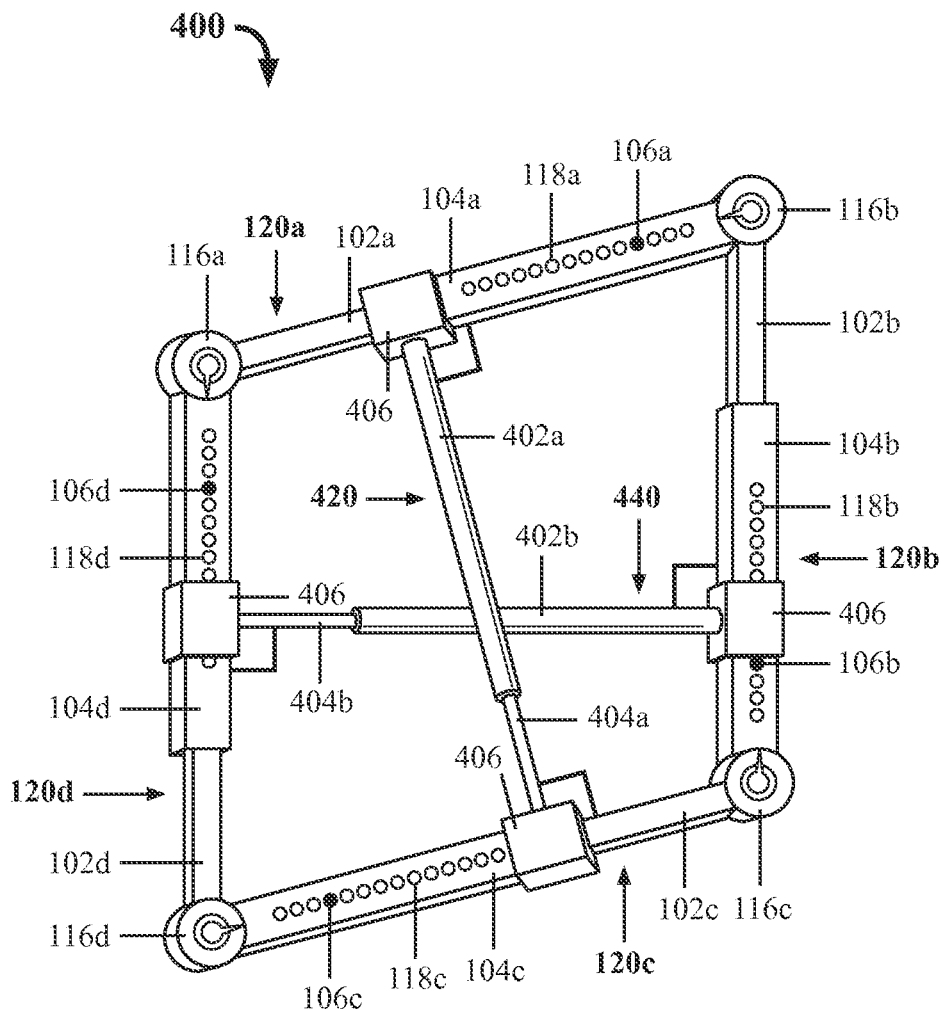
FIG. 4 is a schematic diagram illustrating an exemplary polygonal device for kinesthetic learners where the polygonal shape is a parallelogram having a détente leg structure.

FIG. 4 illustrates a parallelogram device 400 with four legs 120, four angles 116, and two parallel constraints 420, 440. In this embodiment, the extendable legs 120 each include two sections, a first section 102 and a second section 104. As with the triangular device 100 (FIG. 1), the legs may also have any number of sections, a sliding structure, telescopic structure, détente structure, or a combination thereof The angles 116 may be fixed, be hinged, have an angle indicator, be lockable, or any rational combination thereof.

The parallel constraints 420, 440 each include a first section 404a, 404b and a second section 402a, 402b and can extend in the same ways as a leg 120: via a sliding structure, a telescope structure, a détente structure, or any combination thereof. The parallel constraints 420, 440 may have any number of sections. Further, the parallel constraints 420, 440 include a cuff 406 at each end. The cuffs 406 wrap around a leg 120 at each end of the parallel constraint 420, 440. The parallel constraints 420, 440 may move parallel with the legs 120 to which they are attached because the cuffs 406 only wrap around the legs 120, they are not fixed at a specific location on the leg 120. The cuff 406 ensures that the angle between the parallel constraint 420, 440 and the leg 120 with which it is connected remain at a right angle. In this manner, opposite legs 120a and 120c, 120b and 120d remain at right angles with their respective parallel constraints 420, 440 respectively. Therefore, opposite legs 120a and 120c, 120b and 120d remain parallel to each other.

Figure 5:
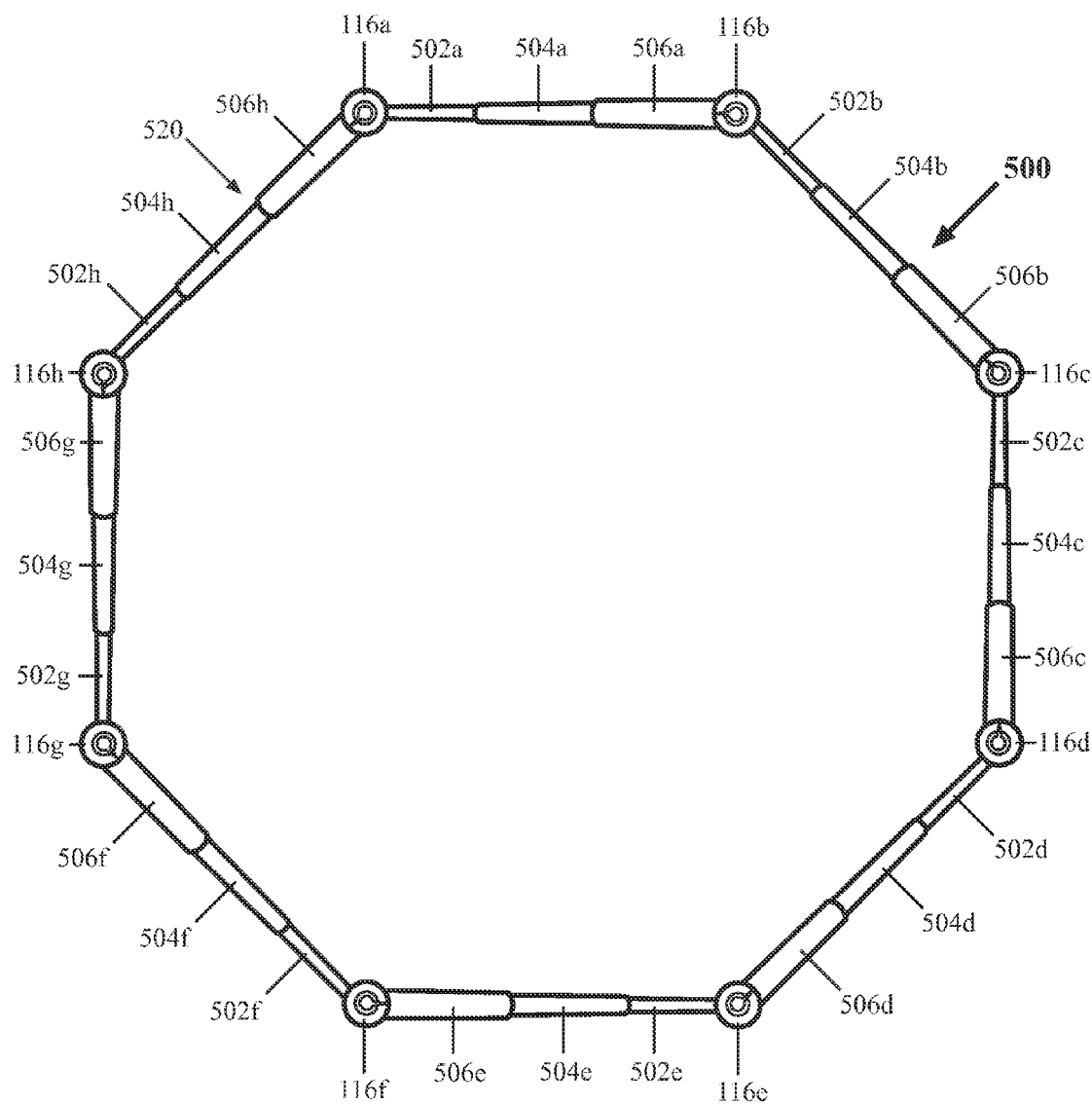
FIG. 5 is a schematic diagram illustrating an exemplary polygonal device for kinesthetic learners where the polygonal shape is an octagon, including a telescopic leg structure.

FIG. 5 illustrates a polygonal device 500 with eight legs 120 and eight angles 116. The legs 120 include a first section 502, a second section, 504, and a third section 506. The first section 502 fits inside of the second section 504 and the second section fits inside of the third section 506. The leg 120 may then be manipulated by the user (expanded and contracted). This leg structure is a telescopic leg structure. When not being manipulated by the user, the legs 120 keep their length through friction. Although illustrated with three sections, any number of sections may be used. In some embodiments, the legs 120 have a sliding structure, détente structure, telescopic structure, or any combination thereof.

The angles 116 may be fixed, be hinged, have an angle indicator, be lockable, or any rational combination thereof. In other embodiments, the polygonal device 500 may be a pentagon, heptagon, octagon (as shown), nonagon, decagon, etc. In several embodiments, the angles 116 are fixed at an angle equal to each other to create a regular polygon 500.

Figure 6A:
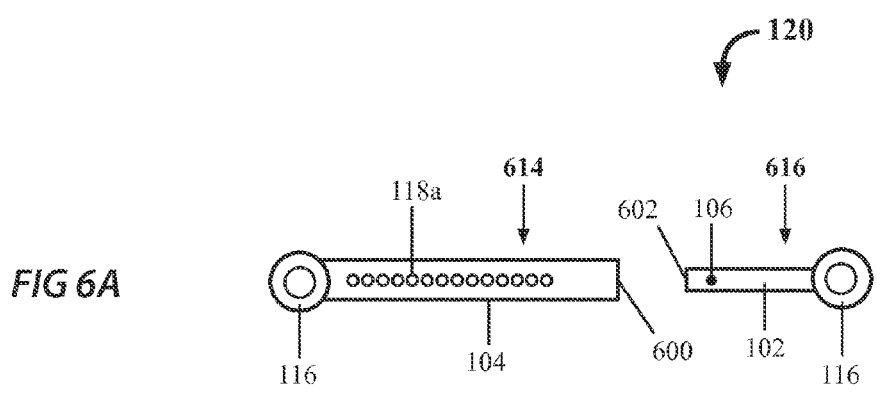
FIG. 6A is a schematic diagram illustrating a two-piece détente leg structure.

FIG. 6A illustrates the détente leg structure with two sections and is not drawn to scale. The leg 120 includes two sections, a first section 616 and a second section 614. The first section 616 includes a leg portion 102, a stopper 106, an angle portion 116, and an end 602. The second section 614 includes a leg portion 104, a plurality of holes 118, an angle portion 116, and an opening 600.

The end 602 of the first section 616 fits into the opening 600 of the second section 614. The opening 600 should be large enough to accommodate the edge 602 and the stopper 106 inserted at an angle to allow the user to disengage the stopper 106 from one of the holes 118a and move the stopper 106 to another hole 118a. Further, the leg portion 102 of the first section 616 should be long enough so the stopper 106 can reach the last hole 118a of the second section 614.

When the stopper 106 is engaged in a hole 118a, then the leg 120 is prevented from moving without user manipulation. The holes 118a may extend entirely through the leg portion 104 of the second section 614 as shown, or may extend only partially through, wherein the hole 118 starts from inside the second section 614, but does not extend to the surface of the second section 614. When engaged, the first section 616 is non-detachably coupled to the second section 614.

Figure 6B:
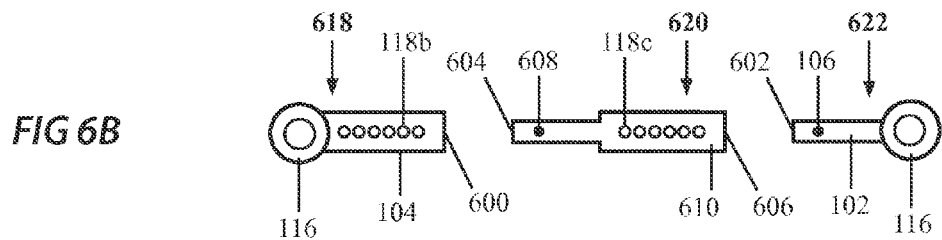
FIG. 6B is a schematic diagram illustrating a three-piece détente leg structure.

FIG. 6B illustrates the détente leg structure with three sections. The leg 120 includes three sections, a first section 622, a second section 620, and a third section 622. The first section 622 includes a leg portion 102, a stopper 106, an angle portion 116, and an end 602. The second section 620 includes holes 118c, an edge 604, an opening 606, a stopper 608, and a leg portion 610. The third section 618 includes a leg portion, an angle portion 116, holes 118b, and an opening 600.

The end 602 of the first section 622 fits into the opening 606 of the second section 620. The opening 606 should be large enough to accommodate the edge 602 and the stopper 106 inserted at an angle to allow the user to disengage the stopper 106 from one of the holes 118c and move the stopper 106 to another hole 118c. Further, the leg portion 102 of the first section 622 should be long enough so the stopper 106 can reach the last hole 118c of the second section 618.

Similarly, the end 604 of the second section 620 fits into the opening 600 of the third section 618. The opening 600 should be large enough to accommodate the edge 604 and the stopper 608 inserted at an angle to allow the user to disengage the stopper 608 from one of the holes 118b and move the stopper 608 to another hole 118b. One skilled in the art should know how to extend this structure to larger numbers of sections.

The functions of the stoppers 106, 608 and the holes 118b, 118c are identical to the functions of the stopper 106 and holes 118a of FIG. 6A. The holes 118b, 118c also may extend entirely or partially through their respective sections 620, 618. Again, the sections 618, 620, 622 are non-detachably coupled when properly engaged.

Figure 7:
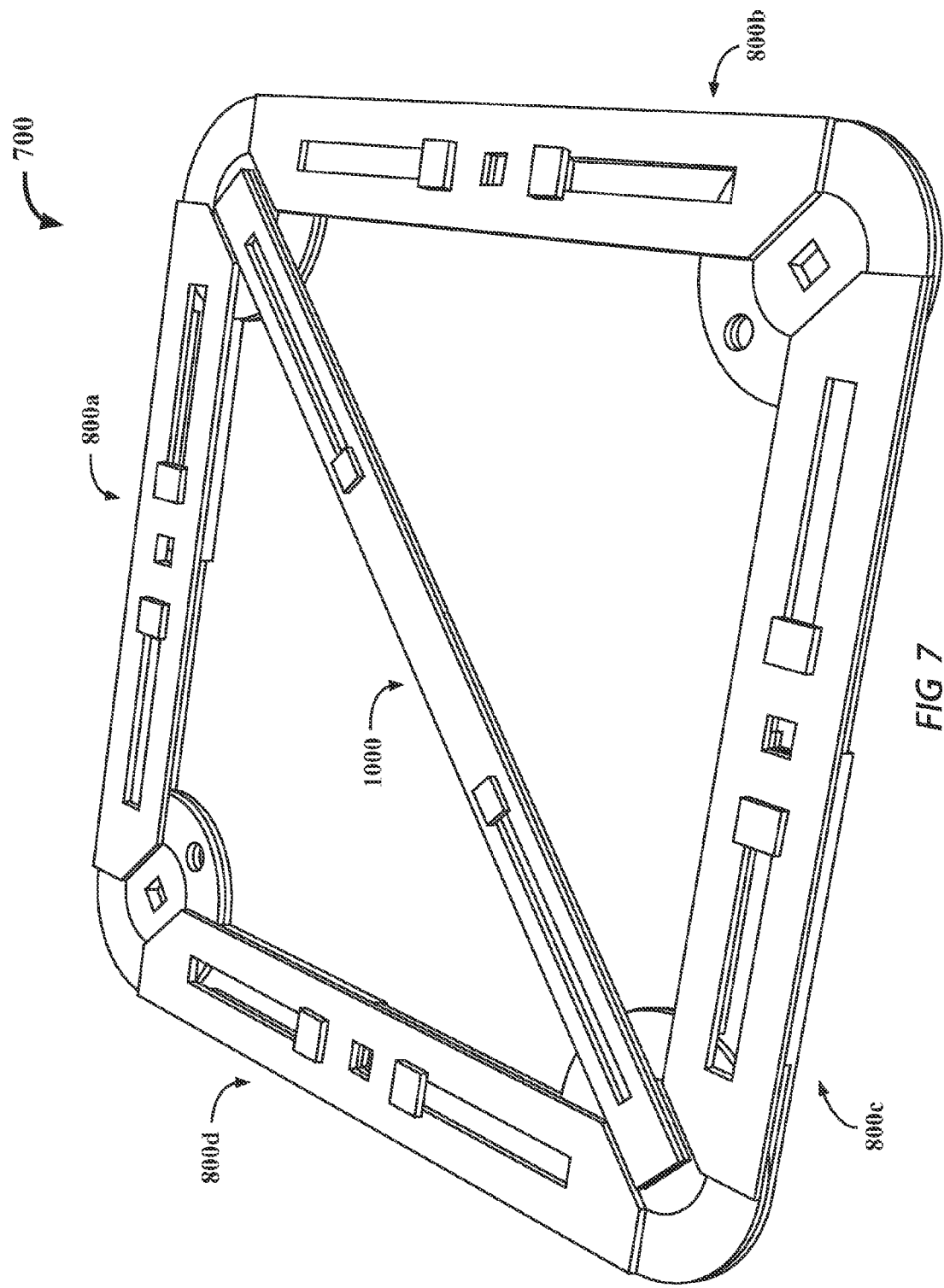
FIG. 7 is an isometric view illustrating an exemplary polygonal device for kinesthetic learners with a sliding leg structure, including a constraint with a sliding structure.

FIG. 7 illustrates the polygonal device 700 with sliding legs 800 and a sliding constraint 1000. The legs 800 are described in greater detail with reference to FIGS. 8A, 8B, 9A, and 9B. The sliding leg structure of three or more sections has several subtypes including, but not limited to, staggered, ascending, and a combination thereof. A sliding leg structure with only two sections has several subtypes: the first section on top, the first section on bottom, or the second section inside the first section and functioning like a razor knife.

FIGS. 8A and 8B describe a staggered sliding leg structure, and FIGS. 9A and 9B describe an ascending sliding leg structure. The constraint 1000 is described in greater detail with reference to FIGS. 10A, 10B, 10C, 10D, 11A, 11B, 12A, and 12B. The sliding leg structures shown in the figures all illustrate a leg with three sections; however, the sliding leg structure may have two or more sections.

FIGS. 8A and 8B illustrate a leg 800a with a staggered sliding structure. The illustrated staggered sliding leg structure includes a first section 802, a second section 826, and a third section 834. The first section includes an angle hole 804, a leg portion 806, an angle constraint hole 808, and a constraint notch 812 flanked by two guards 810 and 814. The second section 826 includes a first section angle constraint notch 818, a first section sliding hole 820, a leg portion 822, a constraint hole 824, a third section sliding hole 828, and a third section angle constraint notch 832. The third section 834 includes a leg portion 836, 846 which is thicker than the leg portion 806 of the first section 802, an angle constraint anchor 838, an angle insert 840, an angle platform 842, an angle constraint hole 844, and a constraint notch 850 flanked by two guards 848, 852.

The leg sections 802, 826, 834 are assembled into a leg 800 with the use of a first section coupler 816 and a third section coupler 830. The first section coupler 816 has a body 854 and a head 856. The body 854 of the first section coupler 816 is inserted through the first section sliding hole 820 of the second section 826 and fixed to the leg portion 806 of the first section 802 such that the first section 802 is non-detachably coupled to the second section 826. The head 856 prevents the second section 826 from being detached from the first section 802.

Even though the first section 802 and the second section 826 are coupled, the first section 802 is still allowed to slide in a direction parallel to the second section 826 using the first section coupler 816 as a guide. The non-circular shape of the body 854 of the first section coupler 816 prevents the first section 802 from rotating in a plane parallel to the second section 826. Thus, the leg 800 is extendable by sliding the first section 802 relative to the section 826 along the path created by the first section sliding hole 820.

The third section coupler 830 has a longer body 858 than the first section coupler 816 and a head 860. The third section coupling 830 couples the third section 834 to the second section 826 in a way similar to the first section coupler 816.

When the leg 800 is fully contracted, i.e. the shortest length possible, the constraint notch 812 of the first section 802 and the constraint notch 850 of the third section 834 create a hole under the constraint hole 824 of the second section 826. The constraint hole 824 is present to accommodate a sliding parallel constraint and will be discussed in greater detail in reference to FIG. 14A. The angle constraint holes 808, 844 are discussed in greater detail with reference to FIG. 10B.

With continued reference to FIGS. 8A and 8B, once a leg 800 is created, several legs 800 may be coupled together to create a polygonal device for kinesthetic learners. Angles are created by non-detachably coupling the first section 802 to the third section 834. The non-detachable coupling methods used include, but are not limited to, snapping into place and the use of magnetic strips. The angle insert 840 of the third section 834 of a first leg 800 is fitted into the angle hole 804 of the first section 802 of a second leg 800. The created angle is able to be manipulated by the user. The first section 802 rests on top of the angle platform 842 of the third section 834 creating an angle with a thickness of the sum of the thickness of the first section 802 and the thickness of the angle platform 842.

This thickness is the reason that the leg portion 836, 846 of the third section 834 is thicker than the thickness of the angle platform 824 alone. The extra thickness allows the angle platform 842 to be lower in space than the plane created by the second section 826 by a thickness substantially similar to the thickness of the first section 802. The leg portions 806, 836, 846 of the first and third sections 802, 834 are both just below the plane created by the second section 826. Therefore, the first section 802 is higher in space than the angle platform 842. When several legs 800 are coupled in the manner above to create a polygonal device, all of the second sections 826 of the legs 800 with a staggered sliding structure are in the same plane.

Referring now to FIGS. 9A and 9B which illustrate an ascending sliding leg structure, a leg 800 is shown with three sections. This ascending sliding leg structure is similar to the staggered leg structure, except the third section 834 is above the second section 826 instead of below it. Descending in one direction is ascending in the other direction, so the ascending leg structure also means a structure where the first section 802 is above the second section 826, and the section 826 is above the third section 834. When using a sliding leg structure, the sliding type may be staggered, ascending, or a combination thereof.

FIGS. 10A and 10C illustrate an angle constraint 1000 with a sliding structure. The angle constraint includes a first section 1002, a second section 1018, and a third section 1030. The first section 1002 includes an angle constraint coupling 1004, an angle constraint stopper 1006 and a constraint portion 1008. The second section 1018 includes a first section sliding hole 1016, a constraint body 1020, and a third section sliding hole 1026. The third section 1030 includes a constraint portion 1032, an angle constraint stopper 1034, and an angle constraint coupling 1036.

The constraint 1000 also includes a first section coupler 1010 with a head 1012 and body 1014, and a third section coupler 1022 with a head 1024 and a body 1026. The first section coupler 1010 body 1014 fits through the first section sliding hole 1016 and non-detachably attaches to the constraint portion 1008 of the first section 1002. The first section 1002 is free to slide in a direction parallel to the second section 1018, but the first section 1002 will not rotate in a plane parallel to the second section 1018 because the first section coupler 1010 is not circular.

The third section coupler 1022 body 1026 fits through the third section sliding hole 1028 and non-detachably attaches to the constraint portion 1032 of the third section 1030. The third section 1030 is free to slide in a direction parallel to the second section 1018, but the third section 1030 will not rotate in a plane parallel to the second section 1018 because the third section coupler 1022 is not circular.

Not shown is a parallel constraint which is identical to the angle constraint 1000, except the parallel constraint does not include the angle constraint stoppers 1006, 1034.

With continued reference to FIGS. 10A and 10C and with reference to FIG. 10B which illustrates an angle, the angle constraint 1000 attaches to the angle of the device. The angle constraint coupling 1004 includes a body 1042 and a head 1044. The body 1042 fits through the angle constraint anchor 838 and attaches to the first section 1002 of the constraint 1000. The angle constraint stopper 1006 fits into a hole created by the alignment of the angle constraint holes 808 (FIG. 8A), 844. When the angle constraint holes 838 (FIG. 8A), 844 are aligned, the angle created is ninety degrees, i.e. a right angle. The angle constraint 1000 maintains a right angle. The angle constraint 1000 is also called a square constraint.

The third section 1030 of the angle constraint 1000 attaches to an angle diagonal from the angle attached to the first section 1002. The use of this angle constraint 1000 in a quadrilateral device creates a square device. The angles are constrained to right angles and the diagonal created maintains the legs to equal lengths.

FIG. 10D illustrates a single angle constraint 1052. The single angle constraint 1052 includes a constraint body 1054, a constraint coupling 1058 with a body 1056 and a head 1060, and a constraint stopper 1062. The single angle constraint 1052 attaches to an angle in the same way the angle constraint 1000 (FIG. 10B) above attaches to an angle. If one single angle constraint 1052 is used in a triangular device, the resulting device is a right triangle device. If three single angle constraints 1052 are used three of the angles of a quadrilateral device, the resulting device is a rectangular device.

FIGS. 11A, 11B, 12A, and 12B illustrate a kite constraint 1100. The kite constraint 1100 includes a pegged section 1102 including a peg 1110, and a holed section 1104 including a hole 1134. The peg 1110 fits into the hole 1134 to create the kite constraint 1100. The peg 1110 is non-circular, so the pegged section 1102 is always orthogonal to the holed section 1104.

The pegged section 1102 further includes a first section 1108, a second section 1112, and a third section 1114. The first section 1108 includes an angle coupling 1106 with a body 1160 and a head 1162. The second section 1112 includes a first section sliding hole 1104 and a third section sliding hole 1122. The third section 1114 includes an angle coupling 1118 with a body 1120 and a head 1116. The pegged section 1102 further includes a first section coupling 1148 with a head 1150 and a body 1152, and a third section coupling 1154 with a head 1156 and a body 1158. The three sections 1102, 1112, 1114 of the pegged section 1102 are assembled as the angle constraint 1000 of FIGS. 10A and 10C.

The holed section 1104 has a structure and is assembled similar to the pegged section 1102. As mentioned above, the pegged section 1102 is attached to the holed section 1104 via the peg 1110 and the hole 1134. The non-circular peg 1110 and hole 1134 ensure the pegged section 1102 is kept orthogonal to the holed section 1104. The resulting constraint is a kite constraint 1100.

Referring now to FIG. 11B, the angle coupling 1106 attaches to an angle. The body 1160 fits through the angle constraint anchor 838 and attaches to the first section 1108 of the pegged section 1102. The kite constraint 1100 does not include angle constraint stoppers 1066 (FIG. 10B), so the angle is free to be manipulated by the user. The circular nature of the angle coupling also allows the angle to be manipulated by the user.

Figure 13A:
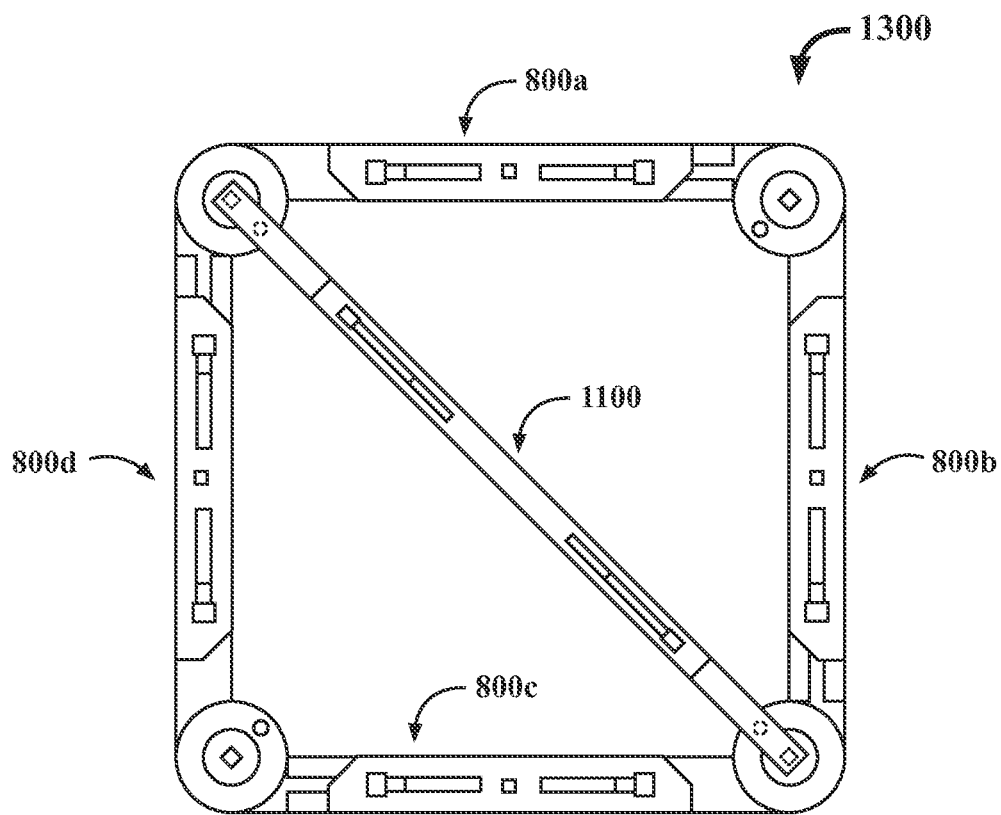
FIG. 13A is a schematic diagram illustrating an exemplary polygonal device for kinesthetic learners where the polygonal shape is a square having a sliding leg structure.

FIG. 13A illustrates a square device 1300 with four legs 800 and an angle constraint 1000, all with staggered sliding structures. The angle constraint 1000, as mentioned above, ensures that the angles remain as right angles and ensures that all legs 800 are the same length, thus a square device 1300 is created.

Figure 13B:
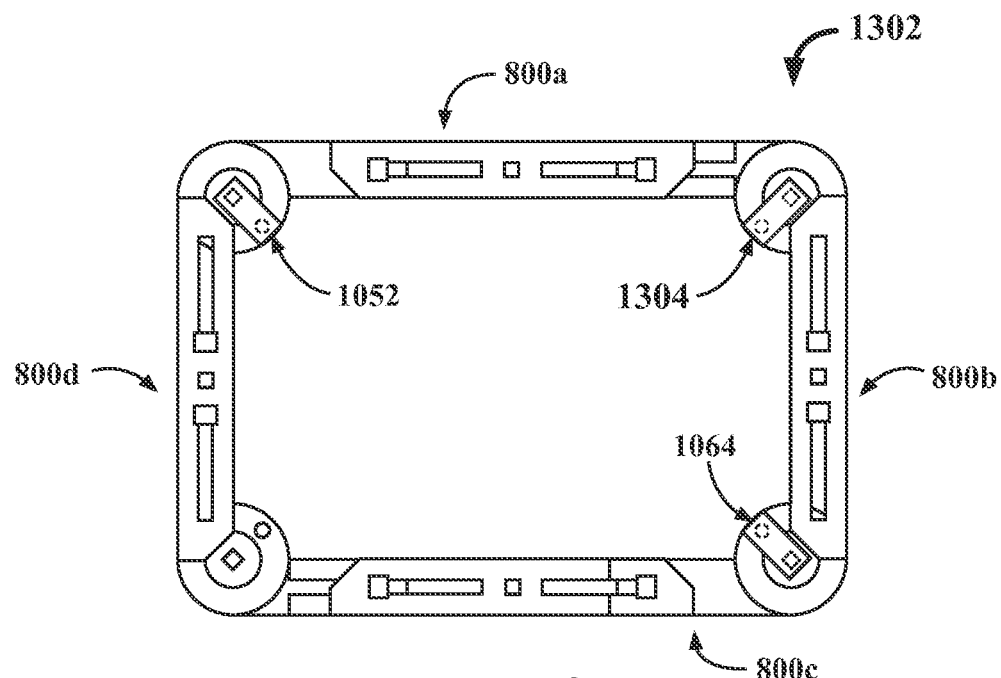
FIG. 13B is a schematic diagram illustrating an exemplary polygonal device for kinesthetic learners where the polygonal shape is a rectangle having a sliding leg structure.

FIG. 13B illustrates a rectangular device 1302 with four legs 800 and three single angle constraints 1052, 1064, 1304. The three single angle constraints 1952, 1064, 1304 placed on any three angles ensure that all the angles are right angles. Thus, opposite legs 800a and 800c, 800b and 800d remain the same length and parallel to each other. However, adjacent legs 800 are not required to be the same length. Therefore, a rectangular device 1302 is created.

Figure 14A:
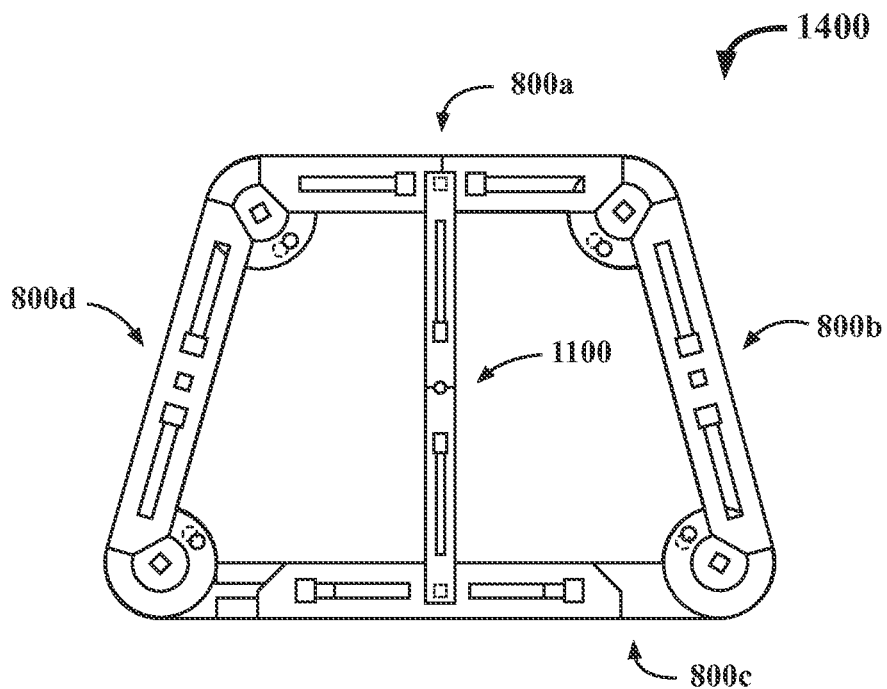
FIG. 14A is a schematic diagram illustrating an exemplary polygonal device for kinesthetic learners where the polygonal shape is a trapezoid with at least one pair of parallel sides having a sliding leg structure.
Figure 14B:
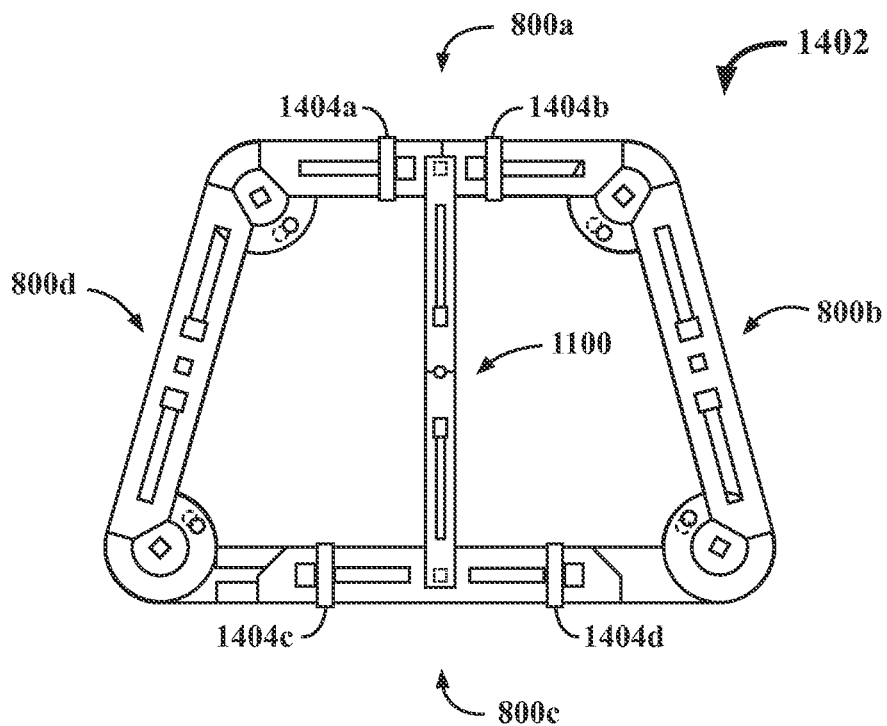
FIG. 14B is a schematic diagram illustrating an exemplary polygonal device for kinesthetic learners where the polygonal shape is a trapezoid with only one pair of parallel sides having a sliding leg structure.

FIGS. 14A and 14B illustrate two trapezoidal devices 1400, 1402 with four legs 800 and a parallel constraint 1000. Trapezoids have two accepted definitions. The first is a quadrilateral with at least one pair of parallel sides. The second is a quadrilateral with only one pair of parallel sides.

The parallel constraint 1000 attaches to opposite legs 800 via the coupling 1004 (FIG. 10A) going through the constraint hole 824 (FIG. 8A) and attaching to the constraint 1000. The non-circular nature of the coupling 1004 (FIG. 10) ensures that the legs 800 do not rotate and thus remain parallel to each other. The angles are free to be manipulated by the user.

FIG. 14A illustrates a trapezoidal device 1400 fitting the first definition. It is possible for the legs 800b, 800d not attached to the constraint 1000 to become parallel through user manipulation.

FIG. 14B illustrates a trapezoidal device 1402 fitting the second definition. The top leg 800a includes two stoppers 1404a, 1404b and the bottom leg 800c also includes two stoppers 1404c, 1404d. In conjunction, the stoppers 1404a, 1404b, 1404c, 1404d ensure that the maximum length of the top leg 800a is shorter than the minimum length of the bottom leg 800c. If the top leg 800a and bottom leg 800c cannot be the same length, then the right and left legs 800b, 800d cannot be parallel to each other.

Figure 15A:
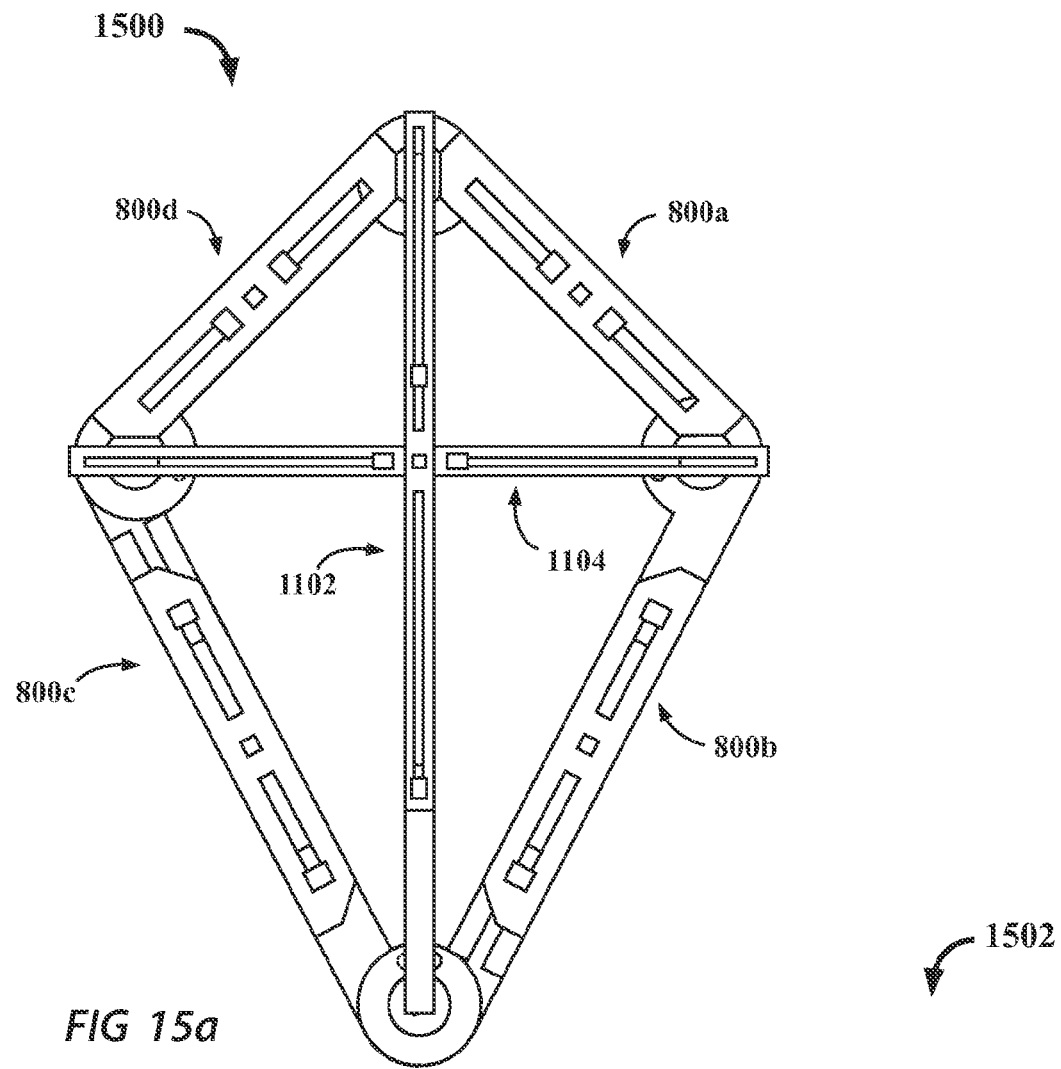
FIG. 15A is a schematic diagram illustrating an exemplary polygonal device for kinesthetic learners where the polygonal shape is a kite having a sliding leg structure.

FIG. 15A illustrates a kite device 1500. The kite device is described in greater detail above with respect to FIGS. 11A, 11B, 12A, and 12B.

Figure 15B:
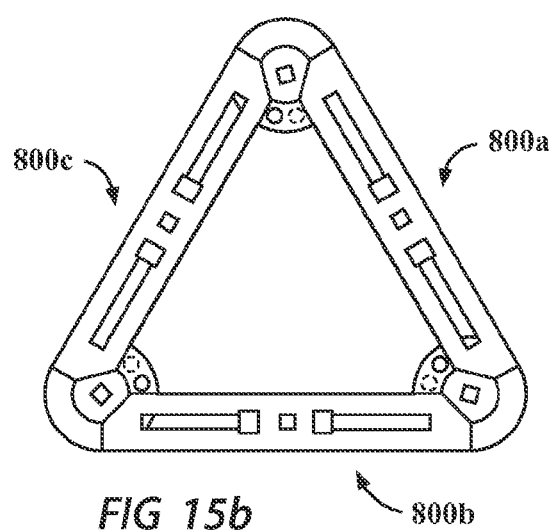
FIG. 15B is a schematic diagram illustrating an exemplary polygonal device for kinesthetic learners where the polygonal shape is a triangle having a sliding leg structure.

FIG. 15B illustrates a triangular device 1502 with a staggered sliding leg structure.

As mentioned above, the shape of the polygonal device described herein is not limited to the shapes explicitly described in the figures. The polygonal device may assume other shapes such as, but not limited to, an unconstrained quadrilateral, a pentagon, a hexagon, a heptagon, an octagon, regular polygons, irregular polygons, convex polygons, and concave polygons. The methods of fixed and extendable legs and fixed and extendable angles may all be present in one polygonal device, i.e. the angles and legs do not need to be uniform.

The polygonal device may be manufactured in any way including, but not limited to, stereo lithography and plastic mold injection. The polygonal device may be made out of any suitable material including, but not limited to, high density polyethylene, nylon 6/6, and other plastics and materials.

The above examples are merely illustrative of several possible embodiments of various aspects of the present disclosure, wherein equivalent alterations and/or modifications will occur to others skilled in the art upon reading and understanding this specification and the annexed drawings. Furthermore, references to singular components or items are intended, unless otherwise specified, to encompass two or more such components or items. In addition, to the extent that the terms "including", includes", "having", "has", "with", or variants thereof are used in the detailed description and/or claims, such terms are intended to be inclusive in a manner similar to the term "comprising". Modifications and alterations will occur to others upon reading and understanding the preceding detailed description. It is intended that the invention be construed as including all such modifications and alterations.

What is claimed is:

1. A polygonal device for teaching kinesthetic learners two-dimensional polygonal shapes, the polygonal device comprising:
   legs, each leg comprising an extendable leg, the extendable leg comprising a first section and a second section, the first section being non-detachably coupled to the second section; and
   angles, wherein each of the angles is non-detachably coupled between two corresponding legs.

2. The polygonal device of claim 1, wherein the first section of the extendable leg comprises holes, and the second section of the extendable leg comprises a stopper, the stopper operative to fit into at least one of the holes to lock at the extendable leg at a desired length until the stopper is released.

3. The polygonal device of claim 1, wherein the first section of the extendable leg is further coupled telescopically to the second section of the extendable leg.

4. The polygonal device of claim 1, wherein the extendable leg further comprises a third section non-detachably coupled between the first section and the second section of the extendable leg.

5. The polygonal device of claim 1, wherein the first section of the extendable leg is further coupled in a sliding structure to the second section the extendable leg.

6. The polygonal device of claim 5, wherein at least part of the sliding structure is a staggered sliding structure.

7. The polygonal device of claim 5, wherein at least part of the sliding structure is an ascending sliding structure.

8. The polygonal device of claim 1, wherein the angles comprise a movable angle, the movable angle comprises a hinge, the hinge operative to allow the movable angle to vary in degree.

9. The polygonal device of claim 8, wherein a first leg is magnetically coupled to a second leg to produce the hinge.

10. The polygonal device of claim 8, wherein the movable angle further comprises a locking mechanism, the locking mechanism operative to secure the movable at a desired angle until the locking mechanism is released.

11. The polygonal device of claim 1, including four legs and four angles.

12. The polygonal device of claim 11 further comprising a constraint coupled between a first angle, a second angle, a third angle, and a fourth angle.

13. The polygonal device of claim 12, wherein the constraint is non-detachably coupled between the first angle, the second angle, the third angle, and the fourth angle.

14. The polygonal device of claim 11 further comprising a constraint coupled between a first angle and a second angle.

15. The polygonal device of claim 14, wherein the constraint is non-detachably coupled between the first angle and the second angle.

16. The polygonal device of claim 11 further comprising a first constraint coupled between a first angle and a second angle, and a second constraint coupled between a third angle, and a fourth angle.

17. The polygonal device of claim 1, wherein at least one of the angles is a fixed angle.

18. The polygonal device of claim 1 further including a constraint coupled between a first leg and a second leg.

19. The polygonal device of claim 18, wherein the constraint is non-detachably coupled between the first leg and the second leg.

20. The polygonal device of claim 1, wherein a leg includes a stopper that ensures that a maximum length of the leg is shorter than a minimum length of another leg.

* * * * *

UNITED STATES PATENT AND TRADEMARK OFFICE
CERTIFICATE OF CORRECTION

PATENT NO. : 8,939,767 B2
APPLICATION NO. : 13/789743
DATED : January 27, 2015
INVENTOR(S) : Shannon Driskell et al.

It is certified that error appears in the above-identified patent and that said Letters Patent is hereby corrected as shown below:

In the Claims

Column 11, line 28, claim 5, "second section the extendable" should read --second section of the extendable--;

Column 12, line 5, claim 10, "secure the movable" should read --secure the movable angle--.

Signed and Sealed this
Ninth Day of June, 2015

Michelle K. Lee
*Director of the United States Patent and Trademark Office*